United States Patent
Weindorf et al.

(10) Patent No.: US 12,197,069 B1
(45) Date of Patent: *Jan. 14, 2025

(54) SYSTEM AND METHOD FOR ADJUSTING LIGHT INTENSITY IN A DISPLAY SYSTEM

(71) Applicant: VISTEON GLOBAL TECHNOLOGIES, INC., Van Buren Township, MI (US)

(72) Inventors: Paul Fredrick Luther Weindorf, Novi, MI (US); David Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,877

(22) Filed: Sep. 5, 2023

(51) Int. Cl.
*G02F 1/1335* (2006.01)
*G02F 1/13357* (2006.01)

(52) U.S. Cl.
CPC .. *G02F 1/133601* (2021.01); *G02F 1/133536* (2013.01); *G02F 1/133605* (2013.01)

(58) Field of Classification Search
CPC ......... G02F 1/133601; G02F 1/133536; G02F 1/133605
See application file for complete search history.

(56) References Cited

U.S. PATENT DOCUMENTS

| | | | |
|---|---|---|---|
| 5,299,039 A | 3/1994 | Bohannon | |
| 5,686,979 A | 11/1997 | Weber et al. | |
| 5,818,522 A | 10/1998 | Sato | |
| 7,106,396 B2 | 9/2006 | Suzuki | |
| 7,268,841 B2 | 9/2007 | Kasajima et al. | |
| 7,495,719 B2 | 2/2009 | Adachi et al. | |
| 7,916,223 B2 | 3/2011 | Kitagawa et al. | |
| 8,045,098 B2 | 10/2011 | Kitagawa et al. | |
| 8,248,555 B2 | 8/2012 | Senoue et al. | |
| 8,482,698 B2 | 7/2013 | Atkins | |
| 8,672,493 B2 | 3/2014 | Tsuda et al. | |
| 8,891,042 B1 | 11/2014 | Osterman et al. | |
| 9,329,430 B2 | 5/2016 | Erinjippurath et al. | |
| 9,535,280 B2 | 1/2017 | Borrelli et al. | |
| 9,684,204 B2 | 6/2017 | Sakai et al. | |
| 9,772,530 B2 | 9/2017 | Gilbert | |
| 9,860,516 B2 | 1/2018 | Muneki et al. | |

(Continued)

FOREIGN PATENT DOCUMENTS

| EP | 1024393 A1 * | 8/2000 | ....... G02F 1/133509 |
|---|---|---|---|
| JP | 2010134269 A | 6/2010 | |

(Continued)

OTHER PUBLICATIONS

Panasonic Develops Industry's First IPS Liquid Crystal Panel with Contrast Ration of over 1,000,000:1, Panasonic Corporation Press Release, Nov. 28, 2016, pp. 1-5, Panasonic Corporation.

*Primary Examiner* — Doon Y Chow
(74) *Attorney, Agent, or Firm* — Quinn IP Law

(57) ABSTRACT

A display system includes a backlight configured to project light. A first display unit is disposed proximate the backlight. A second display unit is disposed proximate the first display unit. A microcontroller is in communication with one or more of the backlight, the first display unit and the second display unit. The microcontroller executes instructions to adjust the first display unit between a first transmissive state and a second transmissive state.

20 Claims, 5 Drawing Sheets

(56) References Cited

U.S. PATENT DOCUMENTS

| | | | |
|---|---|---|---|
| 9,864,243 B2 | 1/2018 | Erinjippurath et al. | |
| 10,056,022 B2 | 8/2018 | Bonnier et al. | |
| 10,191,337 B2 | 1/2019 | Ono | |
| 10,310,346 B2 | 6/2019 | Kim et al. | |
| 11,747,672 B2 * | 9/2023 | Weindorf | G02F 1/133606 362/97.1 |
| 2003/0081402 A1 * | 5/2003 | Jeon | G02B 6/0091 362/330 |
| 2004/0051827 A1 * | 3/2004 | Hinata | H04M 1/0266 349/113 |
| 2004/0125430 A1 * | 7/2004 | Kasajima | G02F 1/133536 359/247 |
| 2004/0218118 A1 | 11/2004 | Hayashi | |
| 2005/0088401 A1 | 4/2005 | Daly | |
| 2006/0191177 A1 | 8/2006 | Engel | |
| 2008/0007486 A1 | 1/2008 | Fujinawa et al. | |
| 2008/0225512 A1 | 9/2008 | Roberts et al. | |
| 2009/0189543 A1 | 7/2009 | Yeo et al. | |
| 2009/0243504 A1 | 10/2009 | Cho et al. | |
| 2009/0284518 A1 | 11/2009 | Sawabe | |
| 2009/0303419 A1 | 12/2009 | Koma | |
| 2011/0141152 A1 * | 6/2011 | Park | G09G 3/342 345/102 |
| 2011/0141154 A1 | 6/2011 | Ahn et al. | |
| 2011/0164207 A1 | 7/2011 | Arai et al. | |
| 2012/0274878 A1 | 11/2012 | Kunz et al. | |
| 2013/0076704 A1 | 3/2013 | Song et al. | |
| 2013/0141668 A1 | 6/2013 | Washio et al. | |
| 2013/0335682 A1 | 12/2013 | Gilbert et al. | |
| 2014/0293188 A1 | 10/2014 | Casebolt et al. | |
| 2015/0002781 A1 * | 1/2015 | Ma | G02F 1/1347 349/62 |
| 2015/0198834 A1 | 7/2015 | Wu et al. | |
| 2016/0004137 A1 | 1/2016 | Sagardoyburu | |
| 2016/0119613 A1 | 4/2016 | Smith | |
| 2016/0170702 A1 | 6/2016 | Jiang et al. | |
| 2016/0216540 A1 * | 7/2016 | Cho | G02F 1/13471 |
| 2016/0372058 A1 | 12/2016 | Wang et al. | |
| 2017/0031206 A1 | 2/2017 | Broughton et al. | |
| 2017/0184870 A1 * | 6/2017 | Li | G03B 21/006 |
| 2018/0011365 A1 | 1/2018 | Shields et al. | |
| 2018/0031897 A1 | 2/2018 | Takao et al. | |
| 2018/0047345 A1 * | 2/2018 | Dunn | G09G 3/3607 |
| 2018/0059465 A1 * | 3/2018 | Koudo | G02F 1/13471 |
| 2018/0120634 A1 | 5/2018 | Chen | |
| 2018/0275445 A1 | 9/2018 | Katagiri et al. | |
| 2019/0129213 A1 | 5/2019 | Cho et al. | |
| 2019/0171045 A1 | 6/2019 | Masuda | |

FOREIGN PATENT DOCUMENTS

| | | |
|---|---|---|
| WO | 2009107536 A1 | 9/2009 |
| WO | 2011162133 A1 | 12/2011 |

\* cited by examiner

SYSTEM AND METHOD FOR ADJUSTING LIGHT INTENSITY IN A DISPLAY SYSTEM

CROSS-REFERENCE TO RELATED APPLICATIONS

This application is a Continuation of U.S. Ser. No. 17/433,497, filed Aug. 24, 2023, which is a 371 of International of No. PCT/US2020/019485 filed Feb. 24, 2020, which is a Continuation in Part of U.S. Ser. No. 16/284,627, filed Feb. 25, 2019, and claims the benefit of U.S. Provisional Application No. 62/811,344, filed Feb. 27, 2019, each of which are hereby incorporated by reference in their entirety.

TECHNICAL FIELD

The present disclosure generally relates to systems and methods for adjusting light intensity in a display system, and more particularly to systems and methods for improving the optical efficiency of the display system using a reflective polarizing arrangement.

BACKGROUND

Electronic displays are provided in many contexts to electronically render digital information to a viewer. The electronic displays receive information and render the information through lighted cells in patterns that reflect the texts and pictures employed to convey the information.

An exemplary prior art electronic display is illustrated in FIG. 1. The electronic display 1 is employed to providing electronic content to a viewer of the electronic display. The display 1 includes a bezel 2 defining a border of the display screen. Defining the portion within the bezel 2 is a display portion. The display portion includes a backlit display 3 cooperating with a plurality of LEDs (not shown) and a display linear polarizer 4.

The display 1 is provided with a first layer 5. This first layer 5 is a neutral density filter that reduces or modifies the intensity of all wavelengths or colors, of light equally. The filter transmission may range from colorless (clear) to grey (opaque) with a constant transmission rate. An anti-reflective film 6 is disposed on the first layer 5 and may cancel light reflections to minimize a viewer from seeing visibility variations from the electronic display 1 due to the lighting environment in which the electronic display 1 is exposed.

Exemplary prior art electronic displays may control dimming and adjust visual properties of the display by creating and controlling zones of LEDs to adjust backlighting. However, calibrating and controlling the LED zones can be complex and fail to provide the contrast level adjustments sought in the display.

SUMMARY

Systems and methods are disclosed herein for enhancing the visibility of light-based information rendered on a display system utilizing a local dimming technique. The display system includes a backlight including a housing receiving one or more light emitting elements to generate and project light from the backlight and one or more reflective portions disposed on the housing. A first display unit is disposed proximate the backlight and includes an upper substrate, a liquid crystal layer cooperating with the upper substrate of the first display unit and a lower substrate disposed opposite the upper substrate of the first display unit that cooperates with the liquid crystal layer.

A first reflective polarizer includes a body having an upper surface and an opposing lower surface that cooperates with the upper substrate of the first display unit. A second reflective polarizer includes a body having an upper surface cooperating with the lower substrate of the first display unit and an opposing lower surface.

A second display unit is disposed proximate the first display unit. The second display unit includes an upper substrate, a thin-film transistor (TFT) display layer cooperating with the upper substrate of the second display unit and a lower substrate disposed opposite the upper substrate of the second display unit that cooperates with the TFT display layer. One or more dye based linear polarizers cooperate with one or more of the upper substrate of the second display unit and the lower substrate of the second display unit.

A microcontroller is in communication with one or more of the backlight, the first display unit and the second display unit. The microcontroller executes instructions to adjust the liquid crystal layer of the first display unit between a first transmissive state and a second transmissive state.

A diffusing element is disposed proximate an upper surface of the housing, wherein the diffusing element cooperates with the backlight to distribute light generated by the one or more light emitting elements or reflected from the one or more reflective portions of the backlight. A brightness enhancing film cooperates with the lower surface of the second reflective polarizer. The liquid crystal layer of the first display unit includes a thin film transistor liquid crystal display (LCD) that is disposed between and cooperates with the upper substrate of the first display unit and the lower substrate of the first display unit. The liquid crystal layer of the first display unit is a pixelated monochrome TFT LCD, wherein each pixel of the pixelated monochrome TFT LCD is dynamically configured to optically rotate polarized light to produce a local dimming backlight at a pixel level.

The one or more dye based linear polarizers of the second display unit include a first dye based linear polarizer having a body including an upper surface cooperating with the lower substrate of the second display unit and an opposing lower surface and a second dye based linear polarizer having a body including an upper surface and an opposing lower surface cooperating with the upper substrate of the second display unit. The TFT display layer of the second display unit may include a thin film transistor liquid crystal display disposed between and cooperating with the upper substrate of the second display unit and opposing lower substrate of the second display unit. A diffuser may be disposed between the first display unit and the second display unit. The diffuser provides a light profile transition for light transmitted through the first display unit.

In one or more aspects, a display system includes a backlight including a housing and one or more light emitting elements received in the housing to generate and project light from the backlight and one or more reflective portions disposed on the housing. A first display unit is disposed proximate the backlight and includes an upper substrate, a liquid crystal layer cooperating with the upper substrate of the first display unit, a lower substrate disposed opposite the upper substrate of the first display unit and cooperating with the liquid crystal layer, and one or more reflective polarizers cooperating with one or more of the upper substrate of the first display unit and the lower substrate of the first display unit.

A second display unit is disposed proximate the first display unit and includes an upper substrate, a thin film transistor (TFT) display layer cooperating with the upper substrate of the second display unit, a lower substrate disposed opposite the upper substrate of the second display unit and cooperating with the TFT display layer. A first dye based linear polarizer includes a body including an upper surface cooperating with the lower substrate of the second display unit and an opposing lower surface and a second dye based linear polarizer includes a body including an upper surface and an opposing lower surface cooperating with the upper substrate of the second display unit.

A diffuser is disposed between the first display unit and the second display unit, wherein the diffuser provides a light profile transition for light transmitted through the first display unit. A microcontroller is in communication with one or more of the backlight, the first display unit and the second display unit. The microcontroller executes instructions to adjust the liquid crystal layer of the first display unit between at least a first transmissive state and a second transmissive state.

In one or more aspects, a display system includes a backlight including a housing and one or more light emitting elements received in the housing to generate and project light from the backlight and one or more reflective portions disposed on the housing. A first display unit is disposed proximate the backlight and includes an upper substrate, a liquid crystal layer cooperating with the upper substrate of the first display unit and a lower substrate disposed opposite the upper substrate of the first display unit and cooperating with the liquid crystal layer.

A second display unit is disposed proximate the first display unit. The second display unit includes an upper substrate, a thin film transistor (TFT) display layer cooperating with the upper substrate of the second display unit, a lower substrate disposed opposite the upper substrate of the second display unit and cooperating with the TFT display layer. One or more dye based linear polarizers cooperate with one or more of the first display unit and the second display unit.

A diffuser is disposed between the first display unit and the second display unit, wherein the diffuser provides a light profile transition for light transmitted through the first display unit. At microcontroller is in communication with one or more of the backlight, the first display unit and the second display unit. The microcontroller executes instructions to adjust the liquid crystal layer of the first display unit between at least a first transmissive state and a second transmissive state.

The above features and advantages and other features and advantages of the present teachings are readily apparent from the following detailed description for carrying out the teachings when taken in connection with the accompanying drawings.

Figure 1:
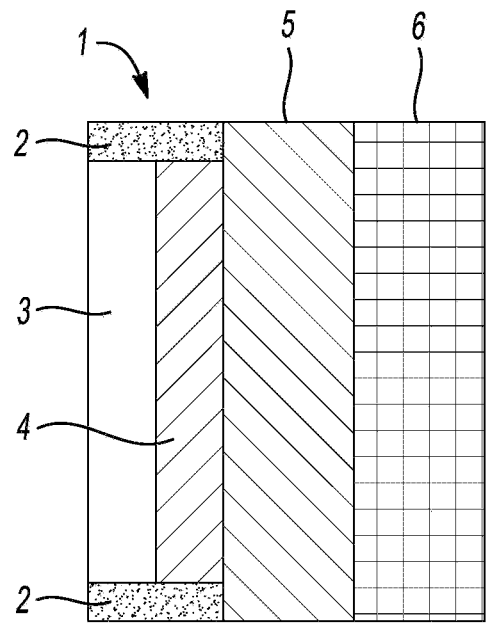
FIG. 1 is a side view of an exemplary prior art implementation of an electronic display.

The present disclosure may have various modifications and alternative forms, and some representative aspects are shown by way of example in the drawings and will be described in detail herein. Novel aspects of this disclosure are not limited in to the particular forms illustrated in the above-enumerated drawings. Rather, the disclosure is to cover modifications, equivalents, and combinations falling within the scope of the disclosure as encompassed by the appended claims.

DETAILED DESCRIPTION

Those having ordinary skill in the art will recognize that terms such as "above," "below," "front", "back", "upward," "downward," "top," "bottom," etc., may be used descriptively herein without representing limitations on the scope of the disclosure, as defined by the appended claims. Furthermore, the present teachings may be described in terms of functional and/or logical block components and/or various processing steps. Such block components may be comprised of various hardware, software, and/or firmware components configured to perform the specified functions.

Referring to the Figures, wherein like numerals indicate like parts throughout the several views, a display system 10 is generally described. The display system 10 is not shown or described as part of a specific application. However, it should be appreciated that the display system 10, or aspects thereof, may be utilized in many different applications, such as but not limited to a vehicular application, an entertainment application, and an advertising display application.

Exemplary vehicular applications include but are not limited to automobiles, airplanes, trains, boats, motorcycles, all-terrain vehicles (ATV), utility task vehicles (UTV), etc. For example, the display system 10 may be incorporated into an instrument cluster, a center console display, a passenger entertainment display, etc. Exemplary entertainment applications include, but are not limited to, gaming systems, televisions, computer screens, etc. The teachings of this disclosure are not limited to the exemplary applications and environments noted above.

Figure 2:
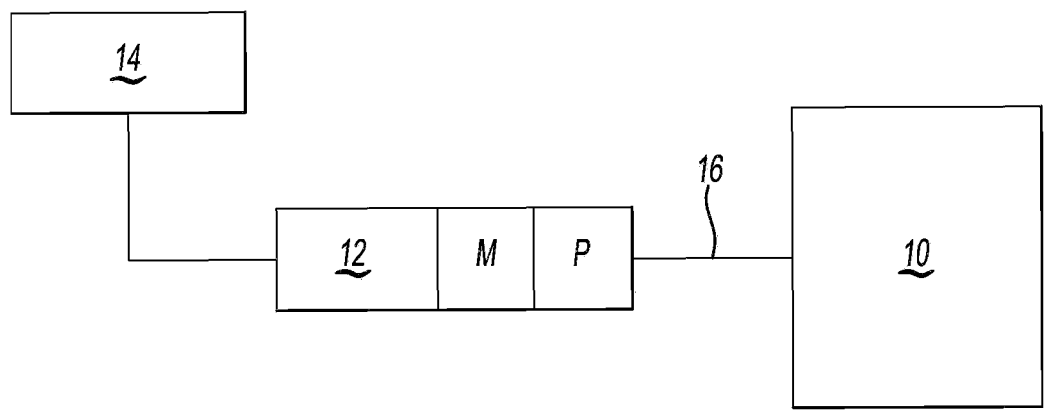
FIG. 2 is a schematic illustration of a system for adjusting light intensity for a display system in accordance with one or more of the aspects disclosed herein.

Referring now to FIG. 2, the display system 10 may include one or more components in electrical communication with a microcontroller 12. The components of the display system 10 may be coupled to the microcontroller in a wired or wireless manner. The microcontroller 12 may include one or more microcontrollers and may include one or more processors (P), each of which may be embodied as a separate processor, an application specific integrated circuit (ASIC), or a dedicated electronic control unit.

The microcontroller 12 may be any sort of electronic processor (implemented in hardware, software, or a combination of both). The microcontroller 12 also includes tangible, non-transitory memory (M), e.g., read only memory in the form of optical, magnetic, and/or flash memory. For example, the microcontroller 12 may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in memory (M) and executed as set forth herein. The executable instructions may be a series of instructions employed to run applications on the microcontroller 12 (either in the foreground or background). The microcontroller 12 may receive commands and information, in the form of one or more input signals, generally represented by box and numeral 14, from various controls or components in the vehicle (not shown) and communicate instructions to the display system 10 through one or more control signals 16 to control the display system 10.

The one or more control signals 16 may represent a dimming level value or command received from one or more sources. Non-limiting examples of the one or more sources may include an ambient light sensor or other vehicle component control signal, or a signal from a user actuating device. The actuating may be an engageable input device or any sort of touch screen interface. The actuating device is not limited to touchable interfaces, and thus, any known human machine interface (HMI) technique may be implemented along with actuating device. The actuating device may be implemented by a user to request a light permeability or dimming level for the display system 10.

Referring now to FIGS. 3-6, one or more aspects of a display system 10 are schematically displayed and described in greater detail herein. The display system 10 may include at least one light source or backlight 20 including one or more light emitting elements 22. The one or more light emitting elements 22 may include one or more light emitting diodes (LEDs) that generate and project light from the backlight to one or more components of the display system 10.

In one or more aspects, the one or more light emitting elements 22 may be arranged in the backlight 20 in a direct-type LED arrangement or in an edge-type LED arrangement. The direct-type LED arrangement positions the one or more LEDs in an array in alignment with the one or more components of the display system to provide direct lighting for the display system 10.

The edge-type LED arrangement positions the one or more light emitting elements 22 around a perimeter of the backlight 20. The edge-type LED arrangement may include one or more reflective plates that directs light from the one or more LEDs toward the one or more components of the display system 10.

The backlight 20 and one or more light emitting elements 22 are adjustable between at least an off state and an on state to illuminate one or more components of the display system 10. In one or more aspects, when the backlight 20 is placed in the off state, the backlight does not emit light and corresponds to zero percent (0%) light transmittance or light intensity. When the backlight is placed in an on state, the one or more light emitting elements 22 of the backlight 20 emit light corresponding to a range of light transmittance or light intensity between greater than zero percent (0%) and one hundred percent (100%) light transmittance or light intensity. The light intensity of the one or more light emitting elements 22 of the backlight 20 may be controlled by the microcontroller 12.

The backlight 20 may include a housing 24 defining at least an upper surface 26 and an opposing lower surface 28. The housing 24 may be configured to receive or cooperate with the one or more light emitting elements 22. The upper surface 26 and opposing lower surface 28 define a light pipe 30 therebetween. At least one of the upper surface 26 and the lower surface 28 of housing 24 may include one or more reflective portions 32. The one or more reflective portions 32 may be configured to direct light generated by the one or more light emitting elements 22 to the one or more components of the display system 10 and, as will be described in greater detail, redirect light reflected from reflective polarizer components provided in the display system 10 back to the one or more components of the display system 10 to increase the operational efficiency and reduce power consumption of the backlight 20.

In one or more aspects, a diffusing element 34 may be disposed proximate the upper surface 26 of the housing 24 of the backlight 20. The diffusing element 34 cooperates with the backlight to uniformly distribute light generated by the one or more light emitting elements 22 or reflected off of the one or more reflective portions disposed on the housing of the backlight 20 to the one or more components of the display system 10 and reduce potential areas of brighter or dimmer lighting generated by the backlight 20.

The display system 10 includes a first display unit 40 disposed proximate the backlight 20. The first display unit 40 may include a shutter cell or liquid crystal layer 42 disposed between a semi-transparent or transparent upper conductive layer or substrate 44 and an opposing semi-transparent or transparent lower conductive layer or substrate 46. The first display unit 40 may include one or more reflective polarizers 50 cooperating with the upper substrate 44.

The liquid crystal layer 42 of the first display unit 40 may be a device such as a Thin Film Transistor (TFT) liquid crystal display (LCD), otherwise referred to as the TFT display layer. Alternatively, the first display unit 40 may be formed as another form of liquid crystal cell device configuration, such as multiplexed film compensated super twist nematic (FSTN), twisted nematic (TN), in-plane switching (IPS), multi-domain vertical alignment (MVA) or another type of liquid crystal display mode that causes light polarization rotation.

The liquid crystal layer 42 of the first display unit 40 may include a plurality of pixels arranged in a row and column format on a thin film arrangement. Each pixel is attached to a transistor. A charge is applied to the transistor for each pixel to adjust the state of the pixel between an actuated and non-actuated state. It is contemplated, in one or more aspects, that the first display unit 40 will include a monochrome TFT liquid crystal display (LCD) or a display unit having color filters removed from the display.

In general, propagating light waves generate an electric field. The electric field oscillates in a direction that is perpendicular/orthogonal to the light wave's direction of propagation. Light is unpolarized when the fluctuation of the electric field direction is random. Conversely, light may be described as polarized when fluctuation of the electric field is highly structured, with laser beams being a common example of highly polarized light and sunlight or diffuse overhead incandescent lighting being examples of unpolarized light.

One or more reflective polarizers 50 may cooperate with one or more of the upper substrate of the first display unit 40 and the lower substrate of the first display unit 40. In one or more aspects, the one or more reflective polarizers 50 include a first reflective polarizer 50 and a second reflective polarizer 60. The first reflective polarizer 50 and the second reflective polarizer 60 may be formed as a film that is joined or coupled to the substrates 44, 46 using an additive procedure such as an adhesive process, a bonding, and a lamination. When assembled, the first reflective polarizer 50, upper substrate 44, liquid crystal layer 42, lower substrate 46 and second reflective polarizer 60 cooperate to form the first display unit 40.

The second reflective polarizer 60 may be configured to only allow light directed from the backlight 20 with the correct polarization angle to pass through the second reflective polarizer 60. Conversely, light directed from the backlight 20 that is not of the correct polarization angle is reflected by the second reflective polarizer 60.

Figure 3:
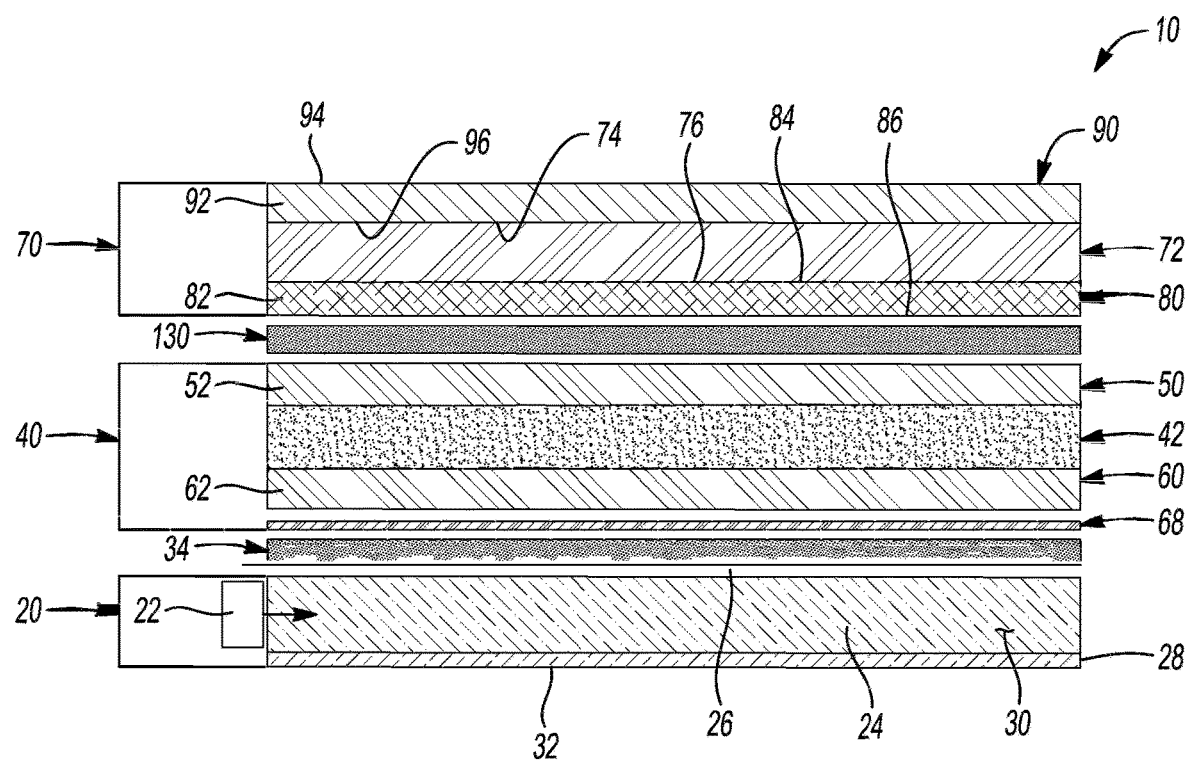
FIG. 3 is a schematic side view of the display system constructed in accordance with one or more of the aspects disclosed herein.

The first reflective polarizer 50 includes a body 52 having an upper surface 54 and an opposing lower surface 56 that cooperates with the upper substrate 44 of the first display unit 40. The second reflective polarizer 60 includes a body 62 including an upper surface 64 cooperating with the lower substrate 46 of the first display unit 40 and an opposing lower surface 66. The first reflective polarizer 50 and second reflective polarizer 60 may each include a reflective polarizer film bonded or otherwise attached to one or more surfaces of the first reflective polarizer 50 and second reflective polarizer 60. As is shown in FIG. 3, the lower surface 66 of the second reflective polarizer 60 may cooperate with a brightness enhancing film (BEF) 68 to reorient and enhance light from outer regions or angles of the backlight 20 into a central region proximate the liquid crystal layer 42 of the first display unit 40.

Two special classes of reflective polarizer materials that may be used for cooperating with the first reflective polarizer 50 and second reflective polarizer 60, or in the construction of the first reflective polarizer 50 and the second reflective polarizer 60, may include commercially available as 3M™ Reflective Polarizer Mirror (RPM) and 3M™ Windshield Combiner Film (WCF), both available from THE 3M COMPANY, with headquarters located in Maplewood, MN. Other reflective polarizer materials having similar properties such as wire grid polarizers may be used to form the first and second reflective polarizer 50, 60 in other aspects.

The display system 10 additionally includes a second display unit 70 disposed proximate the first display unit 40. The second display unit 70 may include a TFT display layer 72 having an upper substrate 74 and an opposing lower substrate 76. The TFT display layer 72 may be configured as a TFT display or may be formed as a device such as, a color TFT Liquid Crystal Display (LCD) or the like, for use as a digital presentation device to display content, such as a group of virtual or reconfigurable instruments that display operational information of the vehicle.

In one or more aspects, the TFT display layer 72 of the second display unit 70 may include a liquid crystal display disposed between the upper substrate 74 and the lower substrate 76. The substrates 74, 76 of the second display unit 70 may be formed from glass and provide a structure on which to apply additive materials such as a color filter, for example.

One or more linear polarizers 80 may cooperate with the TFT display layer 72 to form the second display unit 70. The one or more linear polarizers 80 may be formed as a film that cooperates with one or more of the upper substrate 74 and the lower substrate 76 of the second display unit 70. Linear polarizers are polarizers designed to linearly polarize incoming light and absorb light that is not in the correct polarization angle. Passing white light through a linear polarizer blocks half of the incident light, causing the electric field component to displace so that it oscillates in only one plane with respect to the direction of propagation.

In one or more aspects, the one or more linear polarizers 80 may be formed of a dye treated or dye based polarizing film or may be formed of an iodine treated or iodine based polarizing film and include a first linear polarizer 80 and a second linear polarizer 90. An optical compensating film in which a contrast, a display color and a visual property of a liquid crystal display (LCD) are significantly improved may also be used in connection with the one or more linear polarizers.

In one or more aspects, the one or more linear polarizers 80 may include a first linear polarizer 80 and a second linear polarizer 90. The first linear polarizer 80 includes a body 82 including an upper surface 84 cooperating with the lower substrate 76 of the second display unit 70 and an opposing lower surface 86.

The second linear polarizer 90 includes a body 92 having an upper surface 94 and an opposing lower surface 96 cooperating with the upper substrate 74 of the second display unit 70. The first and second linear polarizer 80, 90 may be joined or coupled to the TFT display layer 72 and substrates 74, 76 to form the second display unit 70 using an additive procedure such as an adhesive process, a bonding, and a lamination.

The first linear polarizer 80 may be configured to allow light transmitted from the backlight 20 to pass through to the TFT display layer 72. Conversely, the second linear polarizer 90 may be configured to control the emittance of light from the TFT display layer 72. In one or more aspects, transmission axes of the first reflective polarizer 50 and the second reflective polarizer 60 are aligned with a transmission axis of the first linear polarizer 80.

Figure 4:
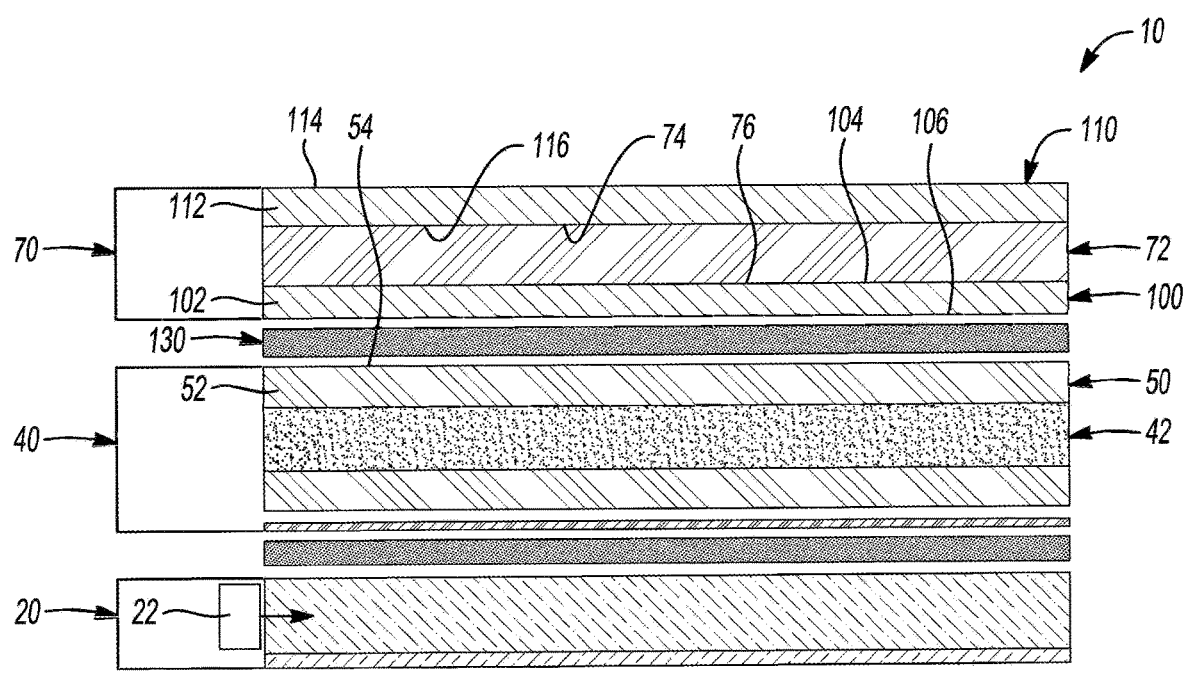
FIG. 4 is a schematic side view of the display system constructed in accordance with another of the one or more of the aspects disclosed herein.

Referring now to FIG. 4, in another of the one or more aspects of the display system 10, the one or more linear polarizers 100 may be formed as a dye treated or dye based polarizing film. The dye based polarizing film may utilize a single dye to absorb one wavelength or color band or may utilize multiple dyes to absorb wavelengths across the visible range or spectrum.

Dye based polarizing films may be used in connection with the one or more linear polarizers 100 in environments where the operating conditions of the display system 10 may be subject to elevated or higher operational temperatures of at least about 95 degrees Celsius (95° C.) to provide extended durability and consistency in display system operations. In one or more non-limiting aspects, the one or more linear polarizers in operation, depending on thermal design and power dissipation of the display units and related electronics of the display system, may experience a temperature increase of about 10 degrees Celsius (10° C.) to about 40 degrees Celsius (40° C.) relative to the ambient air temperature in the display system.

In one non-limiting example, one or more dye based linear polarizers may be incorporated in the display system 10 where the operating temperatures of the display system may exceed at least one hundred and five degrees Celsius (105° C.). Compared to iodine based linear polarizers, the one or more dye based linear polarizers 100 may allow the display system to be operated in excess of one hundred and five degrees Celsius (105° C.).

Dye based polarizing films may have lower polarization extinction ratios as compared to iodine based polarizing films. The one or more elements of the first display unit 40, including the liquid crystal layer 42, compensate for a potential lower polarizations extinction ratio when applied in combination with the dye based polarizing films of the one or more dye based linear polarizers 100. In one non-limiting example of the one or more aspects, the liquid crystal layer 42 of the first display unit 40 may cooperate to provide a contrast ratio of about ninety (90) to compensate for the use of one or more dye based linear polarizer 100.

In the non-limiting example described above, a contrast ratio of the TFT display layer 72 of the second display unit 70 may be about fifteen hundred to one (1500:1) with the use of iodine based linear polarizers. Use of one or more dye based linear polarizers 100 may provide a contrast ratio of the TFT display layer 72 of the second display unit of about twelve hundred to one (1200:1). The combination of one or more dye based linear polarizers 100 having a contrast ratio of about 1200:1 with the liquid crystal layer 42 of the first display unit 40 having a contrast ratio of about 90:1 will improve the contrast ratio of the TFT display layer 72 of the second display unit 70 to about one hundred and eight thousand to one (108,000:1).

The one or more dye based linear polarizers 100, as shown in FIG. 4, may include a first dye based linear polarizer 100 and a second dye based linear polarizer 110. The first dye based linear polarizer 100 includes a body 102 including an upper surface 104 cooperating with the lower substrate 76 of the second display unit 70 and an opposing lower surface 106.

The second dye based linear polarizer 110 includes a body 112 having an upper surface 114 and an opposing lower surface 116 cooperating with the upper substrate 74 of the second display unit 70. The first and second dye based linear polarizers 100, 110 may be joined or coupled to the TFT display layer 72 and substrates 74, 76 to form the second display unit 70 using an additive procedure such as an adhesive process, a bonding, and a lamination.

Referring now to FIGS. 3 and 4, in one or more aspects, a diffuser 130 may be provided in the display system 10 and disposed between at least the first display unit 40 and the second display unit 70. In the aspects shown in FIGS. 3 and 4, the diffuser 130 may be disposed and positioned between the upper surface 54 of the first reflective polarizer 50 and the lower surface 86, 106 of the first linear polarizer 80, 100. The diffuser 130 may provide a Gaussian like luminance or light profile transition for light transmitted through the first display unit 40, such that any edges between the lit pixels of the first display unit 40 and unlit pixels of the first display unit 40 fades gradually. Unlike a sharp luminance transition that is more noticeable to a user, the Gaussian like luminance or light profile transition created by the diffuser creates a more gradual fade profile that is more difficult for the user to discern the edges between the lit and unlit pixels of the first display unit 40 as the individual dynamically configured pixels either rotate or do not rotate the polarized light to produce a local dimming backlight feature at the pixel level.

Figure 5:
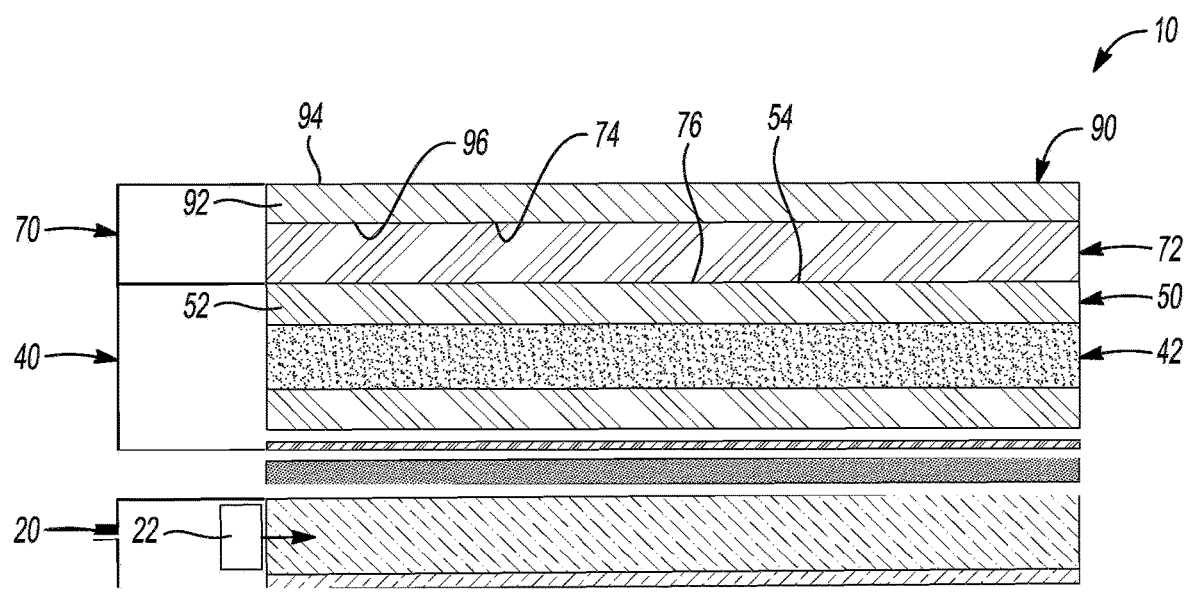
FIG. 5 is a schematic side view of the display system constructed in accordance with an alternative aspect disclosed herein.

In an alternative aspect of the display system 10 shown in FIG. 5, the first display unit 40 is positioned proximate the second display unit 70. The second display unit 70 includes a dye based linear polarizer 90 with a body 92 having an upper surface 94 and an opposing lower surface 96 cooperating with the upper substrate 74 of the second display unit 70. The upper surface 54 of the first reflective polarizer 50 cooperates with the lower substrate 76 of the second display unit 70 to control the emittance of light projected from the one or more light emitting elements 22 and backlight 20 through the first display unit 40 into the TFT display layer 72 of the second display unit 70. The first reflective polarizer 50 may be joined or coupled to the substrate 44 of the first display 40 and the substrate 76 of the second display unit 70 using an additive procedure such as an adhesive process, a bonding, and a lamination.

Figure 6:
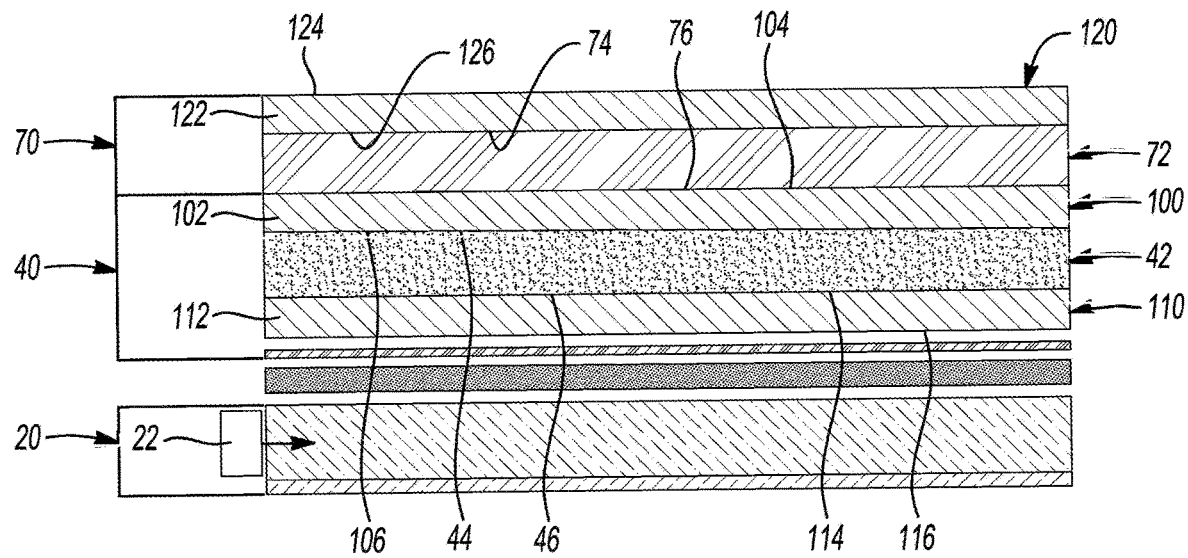
FIG. 6 is a schematic side view of the display system constructed in accordance with yet another alternative aspect disclosed herein.

In yet another alternative aspect of the display system shown in FIG. 6, the first display unit 40 is positioned proximate the second display unit 70. The first display unit 40 may include a shutter cell or liquid crystal layer 42 disposed between a semi-transparent or transparent upper conductive layer or substrate 44 and an opposing semi-transparent or transparent lower conductive layer or substrate 46. The first display unit 40 may include one or more dye based linear polarizers 100 cooperating with the upper substrate 44.

The one or more dye based linear polarizers 100 may include a first dye based linear polarizer 100 and a second dye based linear polarizer 110. The first and second linear polarizer 100, 110 may be formed as a film that is joined or coupled to the substrates 44, 46 using an additive procedure such as an adhesive process, a bonding, and a lamination. When assembled, the first dye based linear polarizer 100, upper substrate 44, liquid crystal layer 42, lower substrate 46 and second dye based linear polarizer 110 cooperate to form the first display unit 40.

The first dye based linear polarizer 100 may include a body 102 having an upper surface 104 and an opposing lower surface 106 that cooperates with the upper substrate 44 of the first display unit 40. The second dye based linear polarizer 110 may include a body 112 including an upper surface 114 cooperating with the lower substrate 46 of the first display unit 40 and an opposing lower surface 116.

The second display unit 70 may include a third dye based linear polarizer 120 with a body 122 having an upper surface 124 and an opposing lower surface 126 cooperating with the upper substrate 74 of the second display unit 70. The upper surface 104 of the first dye based linear polarizer 100 cooperates with the lower substrate 76 of the second display unit 70 to control the emittance of light projected from the one or more light emitting elements 22 and backlight 20 through the first display unit 40 into the TFT display layer 72 of the second display unit 70. The first dye based linear polarizer 100 may be joined or coupled to the substrate 44 of the first display 40 and the substrate 76 of the second display unit 70 using an additive procedure such as an adhesive process, a bonding, and a lamination.

Figure 7:
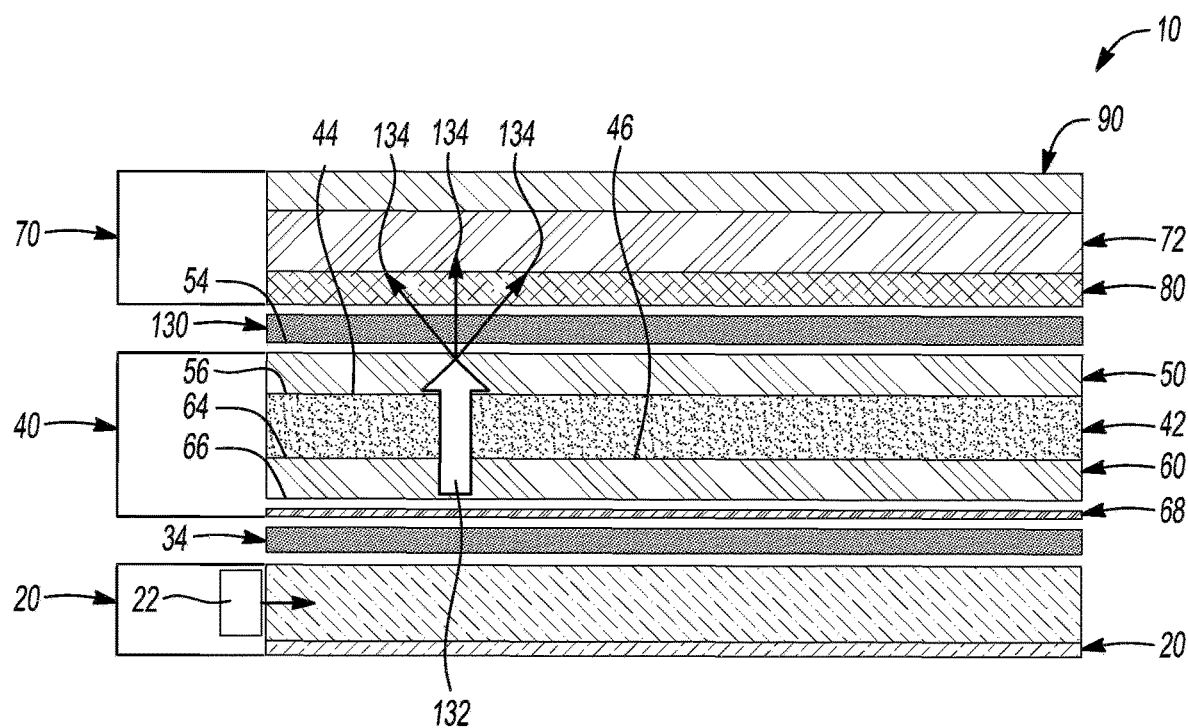
FIG. 7 is a schematic side view of the display system illustrating projection of light through the one or more reflective polarizers in connection with one dimming mode of the display constructed in accordance with one or more of the aspects disclosed herein.

Referring now to FIG. 7, the display system 10 is shown in at least a first configuration, wherein light is projected from the backlight 20 through the one or more components of the display system 10. In this first configuration, the first display unit 40 is placed in a first transmissive state or driven state. In the first transmissive state, polarized light, generally represented by arrow 132, is projected through the first display unit 40 without adjustment or treatment by the liquid crystal layer 42 or one or more of the first reflective polarizer 50 and second reflective polarizer 60.

The polarized light 102 projects through the first reflective polarizer 50 to the diffuser 130, where the light is diffused and distributed in a generally uniform fashion as represented by arrows 134 for projection through the first linear polarizer 80 and TFT display layer 72. The TFT display layer 72 of the second display unit 70, in response to one or more control signals 16 from the microcontroller 12 shown in FIG. 2, may render one or more display features or content resulting in an image that will be projected by the light 102 passing therethrough.

In one or more aspects, if all the layers or components of the display system 10 are laminated together and aligned at the pixel level, local zones could be produced by the first display unit 40 that may be larger by a factor of about 2 times to about 9 times to adjust or align tolerances, thereby reducing or providing a constrained halo zone of light that will be difficult to see due to the luminance of the adjacent transmitting pixel.

Figure 8:
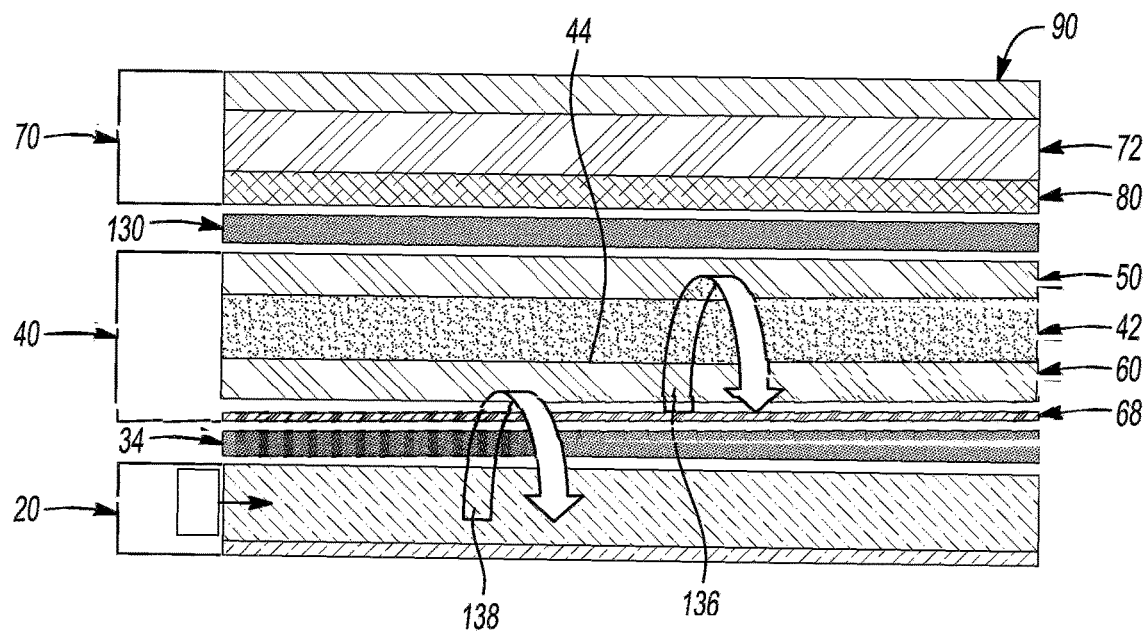
FIG. 8 is a schematic side view of the display system illustrating projection of light through the one or more reflective polarizers in connection with another dimming mode of the display constructed in accordance with one or more of the aspects disclosed herein.

Referring now to FIG. 8, the display system 10 is shown in at least a second configuration, wherein the first display unit 40 is placed in a second transmissive state or undriven state. In the second transmissive or undriven state, the microcontroller 12 as shown in FIG. 2, via one or more control signals 16, in response to one or more input signals 14 instructs the display system 10 to adjust the dimming level of the display system 10.

The liquid crystal layer 42 of the first display unit 40, in response to the one or more control signals 16, is configured to rotate polarized light received from the backlight 20 by 90 degrees, as is represented by arrow 136. The first display unit 40, as a pixelated TFT display, may be dynamically configured to cause individual pixels to either rotate or not rotate the polarized light. It is understood that an individual pixel may dynamically change independently of another pixel. This dynamic control produces the local dimming backlight feature at the pixel level.

In one non-limiting example, in a first transmissive state or driven state, about ninety percent (90%) of the polarized light 102 projected through the second reflective polarizer 60 may be transmitted through the first reflective polarizer 50 to the second display unit 70 to display an image. About ten percent (10%) of the polarized light projected through the second reflective polarizer 60 may be reflected as represented by arrow 138.

In another non-limiting example, in a second transmissive or undriven state, polarized light 106 is rotated 90 degrees by the liquid crystal layer 42 and is reflected by the first reflective polarizer 50 and redirected to be rotated another 90 degrees or undergo a 90 degree twist through the liquid crystal layer 42. In response to the 90 degree twist of the polarized light 106 through the liquid crystal layer 42, the polarized light 106 is aligned to the transmission axis of the second reflective polarizer 60 and is therefore transmitted back into the backlight 20 for recycling and reuse by the display system 10.

In yet another non-limiting example, in a second transmissive or undriven state, about zero percent (0%) of the orthogonal polarized light is transmitted by the first reflective polarizer 50 to the second display unit 70 such that almost no light will pass to the second display unit 70, providing at least a contrast ratio of about 10,000:1. The light 108, whose polarization is orthogonal to the transmission axis of the second reflective polarizer 60, is reflected back into the backlight 20 for recycling and reuse by the display system 10.

About ninety percent (90%) of the reflected light 106 will transmit through the second reflective polarizer 60 into the backlight 20 for reprocessing. As a result, about eighty-one percent (81%) of the reflected light will be recycled for the pixels in the undriven state of the first display unit 40. Since about 81% of the light is recycled for undriven pixels in the first display unit 40, a greater amount of light will be recycled compared to an exemplary display, wherein a linear polarizer absorbs the light.

The microcontroller 12 cooperates with the display system 10 to dynamically control the backlight luminance to assure that the luminance level stays constant. The microcontroller 12 may control the luminance by adjusting the voltage levels supplied to the TFT cells in the liquid crystal layer 42 of the first display unit 40 to locally dim the display system 10.

In one or more aspects, the transmission axis of the first reflective polarizer 50 is aligned with a transmission axis of the linear polarizer 80. The transmissivity state of the display system 10 may be adjusted to one or more configurations as set forth in the table below. Examples 1 and 2 contemplate an arrangement wherein the transmission axes of the first reflective polarizer 50 and second reflective polarizer 60 are aligned in parallel. Examples 3 and 4 contemplate an arrangement wherein the transmission axes of the first reflective polarizer 50 and second reflective polarizer 60 are cross aligned. The liquid crystal layer 42 of the first display unit 40 is pixelated such that each pixel may be dynamically configured to optically rotate, that is, either rotate or not rotate, polarized light, thereby producing a local dimming backlight at the pixel level:

| Reflective Polarizer Transmission Axis Orientation | Undriven State Polarized Light Rotation | Driven State Polarized Light Rotation |
| --- | --- | --- |
| Example 1-Parallel | 90° | 0° |
| Example 2-Parallel | 0° | 90° |
| Example 3-Cross | 90° | 0° |
| Example 4-Cross | 0° | 90° |

In one or more aspects described herein and as set forth in non-limiting Example 1 in the table above. In Example 1, polarized light is rotated 90 degrees when the liquid crystal layer 42 of the first display unit 40 is in an undriven state and the first reflective polarizer 50 and second reflective polarizer 60 are aligned in parallel. Conversely, in Example 3, polarized light is rotated 90 degrees when the liquid crystal layer 42 of the first display unit 40 is in an undriven state and the first reflective polarizer 50 and second reflective polarizer 60 are cross aligned. It is understood that, in an arrangement where the first reflective polarizer 50 and second reflective polarizer 60 are cross aligned, the first reflective polarizer 50 and the linear polarizer 80 are aligned in parallel.

Figure 9:
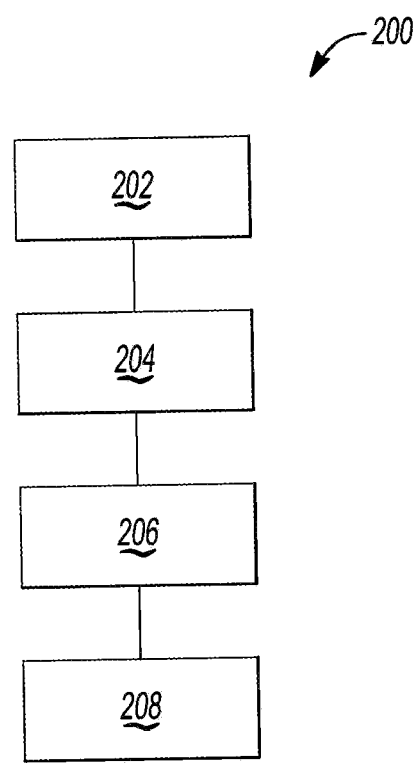
FIG. 9 is a flow chart illustrating a method for adjusting light intensity of the display system in accordance with one or more aspects disclosed herein.

Referring now to FIG. 9, the disclosed display system and the various teachings set forth above may be used as part of a method of adjusting light intensity by repurposing or recycling light using the display system 10, generally represented by reference numeral 200, is described in greater detail. At block 202, the microcontroller 12 in FIG. 2 receives one or more input signals to render content in a display image on the display system 10 and transmit a signal representative of at least a first light intensity value to the one or more light emitting elements to generate and project light at the first intensity value from the backlight to the first display unit.

In one or more aspects, the one or more input signals may be representative of values or measurements of the operating states of at least one component of a vehicle, including, but not limited to, output from the vehicle speed sensor, and the like. The microcontroller 12 may propagate the commands and information received in the one or more input signals and render the content as a display image associated with the speed of the vehicle as a virtual speedometer. The one or more input signals may additionally include input signals received from an actuating device or an ambient light sensor to generate the display image with a lighting or contrast level, such as a contrast level of about seventy percent (70%) black content for the displayed image.

At block 204, the microcontroller 12 may command the pixelated liquid crystal layer 42 of the first display unit 40 to adjust between at least a first transmissive state and a second transmissive state. The pixelated liquid crystal layer 42 is dynamically configured to optically rotate polarized light when adjusted between the first transmissive state and the second transmissive state to produce a local dimming backlight through the first display unit 40 at the pixel level. The microcontroller 12 may command the liquid crystal layer 42 of the first display unit 40 to adjust between at least a first transmissive state and a second transmissive state based on a variety of factors, including the configuration or type and quantity of components, such as the number of reflective polarizers, diffusers and the like, provided in the display system 1-. For example, the adjustment command by the microcontroller 12 may be based upon a display system 10 configuration having a first reflective polarizer 50 cooperating with the first display unit 40.

The adjustment calculation or command may also take other factors into consideration, including, but not limited to, whether light entering the first display unit 40 is polarized and adjusting resolution of the first display unit by a factor of about nine (9) to increase the aperture ratio so that the light obstruction caused by the metalized column lines and row lines of the TFT cell structure of the liquid crystal layer 42 is evaluated. The factor of about nine (9) disclosed above results in a calculation that area of nine color TFT pixels on the TFT display layer 72 of the second display unit 70 has a local dimming area of one TFT pixel on the liquid crystal layer 42 of the first display unit 40. An example of this evaluation is reproduced in the chart below:

|  | Transmission | Notes |
|---|---|---|
| Reflective polarizer (50) | 0.9 | 3M RPM data |
| Monochrome TFT (42) | 0.95 | 1-50%/9 for reduced resolution |
| Total Transmission | 0.855 | Does not include rear polarizer that is part of a normal backlight |

At block 206, the microcontroller 12 may calculate the amount of recycled or reprocessed light generated by the display system 10. The amount of recycled or reprocess light may be subject to factors including, but not limited to, the transmissive state of the liquid crystal layer 42 of the first display unit 40, the number and position of reflective polarizers 50, 60, and the like. In one non-limiting example, the amount of light that may be recycled to the backlight 20 is about fifty-four percent (54%). A representative calculation is shown below:

|  |  | Notes |
|---|---|---|
| Recycled light | 0.7 | 70% black 30% white assumption |
| monochrome TFT AR | 0.95 | AR = Aperture Ratio |
| RPM recycle efficiency | 0.81 |  |
| Recycled light | 0.53865 | 54% of light is recycled |

The amount of light that is recycled by the display system 10 may be dependent on the type of content to be displayed or rendered in an image. The content of the rendered image may change dynamically. As such, the microcontroller 12 of the display system dynamically adjusts the output of the backlight 20 in response to feedback control from one or more components of the display system 10 or in response to calculations stored with executable instructions in the microcontroller 12.

At block 208, the microcontroller 12 may determine the amount of light generated by the backlight 20 relative to a backlight 20 cooperating with one or more reflective polarizers 50 and transmit a signal representative of at least a second light intensity value to the one or more light emitting elements 22 to generate and project light at the second light intensity value from the backlight 20 to the first display unit 40 to display the rendered image on the second display unit 70. In one non-limiting example shown in the table below, the first display unit 40 containing the liquid crystal layer 42 and one or more reflective polarizers 50 has a transmission of about eighty-five and one-half percent (85.5%). As a result, the microcontroller 12 may increase, the backlight 20 light output a factor of 1.17 to make up for the loss created by presence of the liquid crystal layer 42 and one or more reflective polarizers 50 of the first display unit 40.

Since fifty-four percent (54%) of the light is recycled by the display system 10, the microcontroller 12 estimates that about fifty percent (50%) of the recycled light returning to the backlight 20 may be recycled to exit the backlight 20 in the correct polarization. It is understood that the actual amount of light exiting the backlight 20 may vary depending of the recycling efficiency of the backlight structure. As such, the microcontroller 12 can reduce the backlight output to about seventy-three percent (73%) of the original backlight output, resulting in a total of about eighty-five percent (85%) of the light required compared to a conventional backlight.

|  | Relative Amount of Backlight Light Required | Notes |
|---|---|---|
| Factor for monochrome | 1.16959064 | =1/.855 |
| Factor for recycling | 0.73 | 1-.54/2 |
| Total | 0.854 | This means we only need 85% of the light compared to a normal backlight due to recycling |

The resultant lower backlight output provides a more energy efficient, lower power consumption display system 10.

The foregoing detailed description and the drawings are supportive and descriptive of the disclosure, but the scope of the disclosure is defined solely by the claims. As will be appreciated by those of ordinary skill in the art, various alternative designs and aspects may exist for practicing the disclosure defined in the appended claims.

The invention claimed is:
1. A display system comprising:
a backlight including a housing and one or more light emitting elements received in the housing to generate and project light from the backlight and one or more reflective portions disposed on the housing;
a first display unit disposed proximate the backlight, wherein the first display unit includes:
an upper substrate, a liquid crystal layer cooperating with the upper substrate of the first display unit,
a lower substrate disposed opposite the upper substrate of the first display and cooperating with the liquid crystal layer,
a first reflective polarizer having a body including an upper surface and an opposing lower surface joined to the upper substrate of the first display unit, and
a second reflective polarizer having a body including an upper surface joined to the lower substrate of the first display unit and an opposing lower surface;
a second display unit disposed proximate the first display unit, wherein the second display unit includes an upper substrate, a thin film transistor (TFT) display layer cooperating with the upper substrate of the second display unit, a lower substrate disposed opposite the upper substrate of the second display unit and cooperating with the TFT display layer, and one or more dye based linear polarizers joined to one or more of the upper substrate and the lower substrate of the second display unit, the dye based linear polarizers configured to absorb one or more wavelengths or color bands; and
a microcontroller in communication with one or more of the backlight, the first display unit and the second display unit,
wherein the microcontroller executes instructions to adjust the liquid crystal layer of the first display unit between at least a first transmissive state and a second transmissive state, the first transmissive state corresponding with polarized light transmitted from the backlight projecting through the liquid crystal layer of the first display unit toward the second display unit, the second transmissive state corresponding with the liquid crystal layer rotating the polarized light transmitted from the backlight away from the second display unit back toward the backlight for recycling.

2. The display system of claim 1 wherein the liquid crystal layer of the first display unit further comprises a pixelated monochrome TFT liquid crystal display (LCD) disposed between and cooperating with the upper substrate of the first display unit and the lower substrate of the first display unit, wherein the liquid crystal layer is pixelated such that each pixel is dynamically configured to optically rotate the polarized light transmitted from the backlight up to 90 degrees to produce a local dimming backlight at a pixel level.

3. The display system of claim 2 wherein the TFT display layer of the second display unit further comprises a color TFT LCD disposed between and cooperating with the upper substrate of the second display unit and the lower substrate of the second display unit.

4. The display system of claim 3 further comprising a diffusing element disposed proximate an upper surface of the housing, wherein the diffusing element cooperates with the backlight to distribute light generated and projected by the one or more light emitting elements or reflected from the one or more reflective portions.

5. The display system of claim 4 further comprising a brightness enhancing film cooperating with the lower surface of the second reflective polarizer.

6. The display system of claim 3 further comprising a diffuser disposed between the first display unit and the second display unit, wherein the diffuser provides a light profile transition for light transmitted through the first display unit.

7. The display system of claim 1 wherein:
the one or more dye based linear polarizers of the second display unit further comprise:
a first dye based linear polarizer having a body including an upper surface cooperating with the lower substrate of the second display unit and an opposing lower surface; and
a second dye based linear polarizer having a body including an upper surface and an opposing lower surface cooperating with the upper substrate of the second display unit; and
the one or more dye based linear polarizer of the second display unit further comprise a dye based linear polarizer having a body including an upper surface and an opposing lower surface cooperating with the upper substrate of the second display unit.

8. A display system comprising:
a backlight including a housing and one or more light emitting elements received in the housing to generate and project light from the backlight and one or more reflective portions disposed on the housing;
a first display unit disposed proximate the backlight, wherein the first display unit includes:
an upper substrate,
a liquid crystal layer cooperating with the upper substrate of the first display unit,
a lower substrate disposed opposite the upper substrate of the first display unit and cooperating with the liquid crystal layer, and
one or more reflective polarizers cooperating with one or more of the upper substrate of the first display unit and the lower substrate of the first display unit;
a second display unit disposed proximate the first display unit, wherein the second display unit includes:
an upper substrate,
a thin film transistor (TFT) display layer cooperating with the upper substrate of the second display unit,
a lower substrate disposed opposite the upper substrate of the second display unit and cooperating with the TFT display layer, and
a first dye based linear polarizer having a body including an upper surface cooperating with the lower substrate of the second display unit and an opposing lower surface, and
a second dye based linear polarizer having a body including an upper surface and an opposing lower surface cooperating with the upper substrate of the second display unit;
a diffuser disposed between the first display unit and the second display unit, wherein the diffuser provides a light profile transition for light transmitted through the first display unit; and
at least one microcontroller in communication with one or more of the backlight, the first display unit and the second display unit,
wherein the at least one microcontroller executes instructions to adjust the liquid crystal layer of the first display unit between at least a first transmissive state and a second transmissive state, wherein:
the first transmissive state includes a first percentage of polarized light transmitted from the backlight projecting through the liquid crystal layer of the first display unit toward the second display unit; and
the second transmissive state includes a second percentage of the polarized light projecting through the liquid crystal layer of the first display unit toward the second display unit.

9. The display system of claim 8 wherein the liquid crystal layer is pixelated such that each pixel is dynamically configured to optically rotate polarized light and wherein the one or more reflective polarizers further comprise:
  a first reflective polarizer having a body including an upper surface and an opposing lower surface that cooperates with the upper substrate of the first display unit, and
  a second reflective polarizer having a body including an upper surface cooperating with the lower substrate of the first display unit and an opposing lower surface.

10. The display system of claim 8 wherein:
  the liquid crystal layer of the first display unit further comprises a monochrome TFT liquid crystal display (LCD) disposed between and cooperating with the upper substrate of the first display unit and the lower substrate of the first display unit; and
  the second display unit further comprises a color TFT LCD disposed between and cooperating with the upper substrate of the second display unit and the lower substrate of the second display unit.

11. The display system of claim 8 further comprising:
  a diffusing element disposed proximate an upper surface of the housing, wherein the diffusing element cooperates with the backlight to distribute light generated and projected by the one or more light emitting elements or reflected from the one or more reflective portions; and
  a brightness enhancing film cooperating with the one or more reflective polarizers.

12. The display system of claim 8 wherein:
  the second percentage is less than the first percentage; and
  the second transmissive state includes a third percentage of the polarized light rotating away from the second display unit back toward the backlight for recycling.

13. The display system of claim 8 wherein the second percentage is less than the first percentage and greater than zero.

14. A display system comprising:
  a backlight including a housing and one or more light emitting elements received in the housing to generate and project light from the backlight and one or more reflective portions disposed on the housing;
  a first display unit disposed proximate the backlight, wherein the first display unit includes an upper substrate, a liquid crystal layer cooperating with the upper substrate of the first display unit, and a lower substrate disposed opposite the upper substrate of the first display unit and cooperating with the liquid crystal layer;
  a second display unit disposed proximate the first display unit, wherein the second display unit includes an upper substrate, a thin film transistor (TFT) display layer cooperating with the upper substrate of the second display unit and a lower substrate disposed opposite the upper substrate of the second display unit and cooperating with the TFT display layer;
  one or more dye based linear polarizers cooperating with and proximate to one or more of the first display unit and the second display unit;
  a diffuser disposed between the first display unit and the second display unit, wherein the diffuser provides a light profile transition for light transmitted through the first display unit; and
  a microcontroller in communication with one or more of the backlight, the first display unit and the second display unit,
  wherein the microcontroller executes instructions to adjust the liquid crystal layer of the first display unit between at least a first transmissive state and a second transmissive state, the first transmissive state corresponding with a first percentage of polarized light transmitted from the backlight projecting through the liquid crystal layer of the first display unit, the second transmissive state corresponding with a second percentage of the polarized light less than the first percentage projecting through the liquid crystal layer of the first display unit.

15. The display system of claim 14 further comprising a diffusing element disposed proximate an upper surface of the housing, wherein the diffusing element cooperates with the backlight to distribute light generated and projected by the one or more light emitting elements or reflected from the one or more reflective portions.

16. The display system of claim 14 wherein:
  the liquid crystal layer of the first display unit further comprises a monochrome TFT liquid crystal display (LCD) disposed between and cooperating with the upper substrate of the first display unit and the lower substrate of the first display unit; and
  the TFT display layer of the second display unit further comprises a color TFT LCD disposed between and cooperating with the upper substrate of the second display unit and the lower substrate of the second display unit.

17. The display system of claim 14 wherein the liquid crystal layer of the first display unit is pixelated, wherein each pixel is dynamically configured to optically rotate polarized light to produce a local dimming backlight at a pixel level.

18. The display system of claim 14 wherein the one or more dye based linear polarizers of the first display unit further comprise:
  a first dye based linear polarizer having a body including an upper surface and an opposing lower surface that cooperates with the upper substrate of the first display unit;
  a second dye based linear polarizer having a body including an upper surface cooperating with the lower substrate of the first display unit and an opposing lower surface;
  a third dye based linear polarizer having a body including an upper surface and an opposing lower surface cooperating with the upper substrate of the second display unit; and
  the first, second, and third the dye based linear polarizers being configured to absorb one or more wavelengths or color bands.

19. The display system of claim 14 further comprising one or more reflective polarizers cooperating with one or more of the first display unit and the second display unit.

20. The display system of claim 14 wherein the second percentage is greater than zero.

* * * * *